United States Patent [19]

Greenwald

[11] 4,155,438

[45] May 22, 1979

[54] COIN OPERATING MECHANISM UTILIZING A NON-REUSABLE FRANGIBLE COIN-SIMULATING ELEMENT

[75] Inventor: Harry Greenwald, Whitestone, N.Y.

[73] Assignee: Walter Kidde & Company, Inc., Clifton, N.J.

[21] Appl. No.: 752,248

[22] Filed: Dec. 20, 1976

[51] Int. Cl.² .............................................. G07F 7/00
[52] U.S. Cl. ..................................... 194/4 D; 194/92
[58] Field of Search .............. 194/4 R, 4 B, 4 C, 4 D, 194/4 E, 4 F, 4 G, 55, 92

[56] References Cited

U.S. PATENT DOCUMENTS

| 3,200,926 | 8/1965 | Hall | 194/92 |
|---|---|---|---|
| 3,209,882 | 10/1965 | Stevenson et al. | 194/4 G |
| 3,489,259 | 1/1970 | Greenwald et al. | 194/92 |
| 3,878,930 | 4/1975 | Hall | 194/4 E X |

FOREIGN PATENT DOCUMENTS 1399765  7/1972  United Kingdom .................... 194/4 G Primary Examiner—Stanley H. Tollberg
Assistant Examiner—Francis J. Bartuska Attorney, Agent, or Firm—McAulay, Fields, Fisher & Goldstein

[57] ABSTRACT

A combination coin operated mechanism and a non-reusable frangible coin-simulating element that is operative to activate the mechanism. The mechanism is of the type having a coin slide which is adapted to receive the frangible element, and wherein the presence of said element in the mechanism is operative to allow projected movement of the coin slide to an operative position. A camming plate is provided to engage with and deflect the frangible element upon projected movement of the coin slide. A constraining plate is also provided to engage with the deflected frangible element upon projected movement of the coin slide and limit further movement of said element, whereby said element fractures upon continued projected movement of said slide. The camming plate and the constraining plate are also responsive to the presence of a non-fracturable element in the coin operated mechanism to cause said non-fracturable element to jam said mechanism and prevent the continued movement of the coin slide toward its operative position.

6 Claims, 11 Drawing Figures

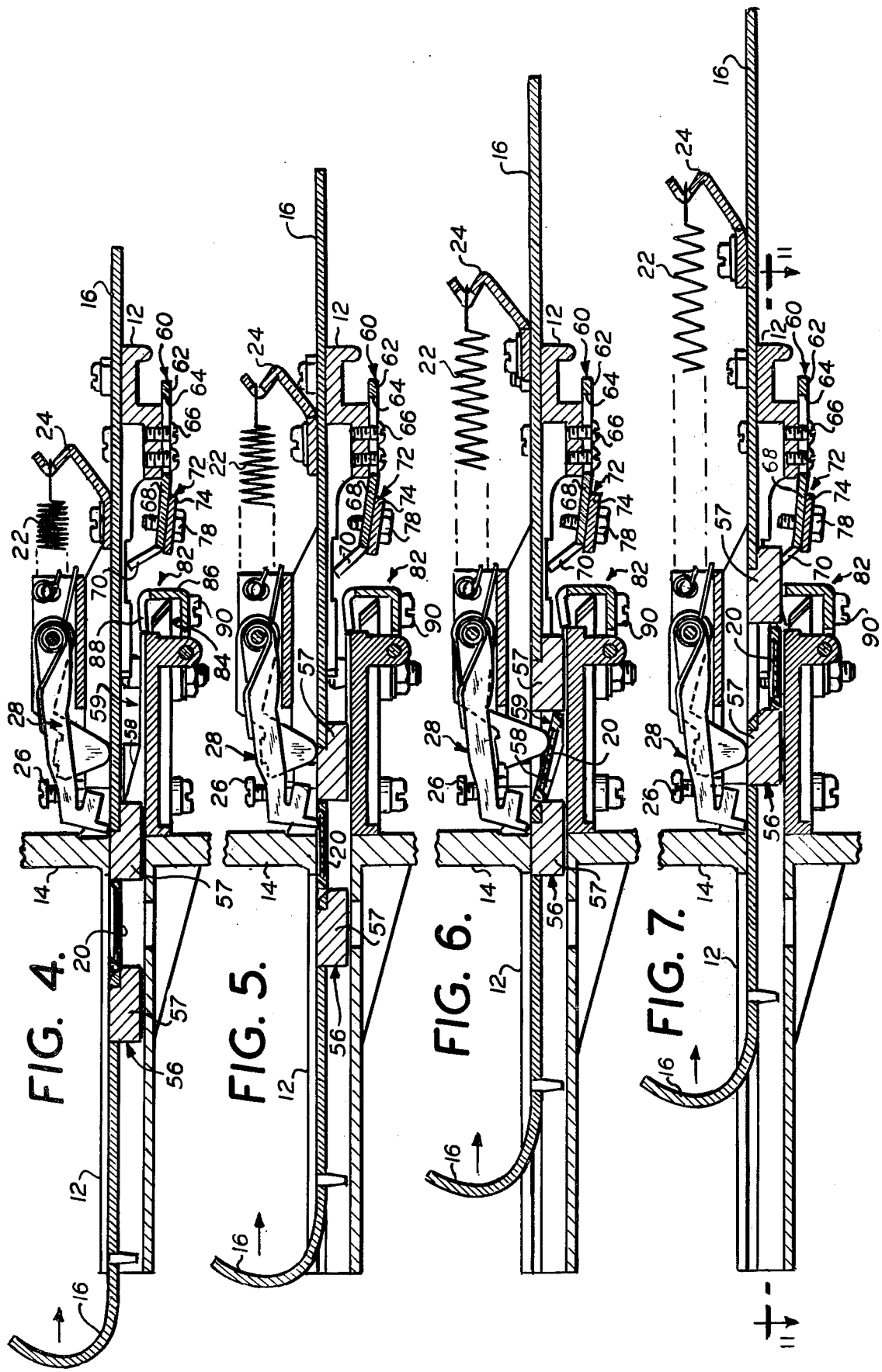

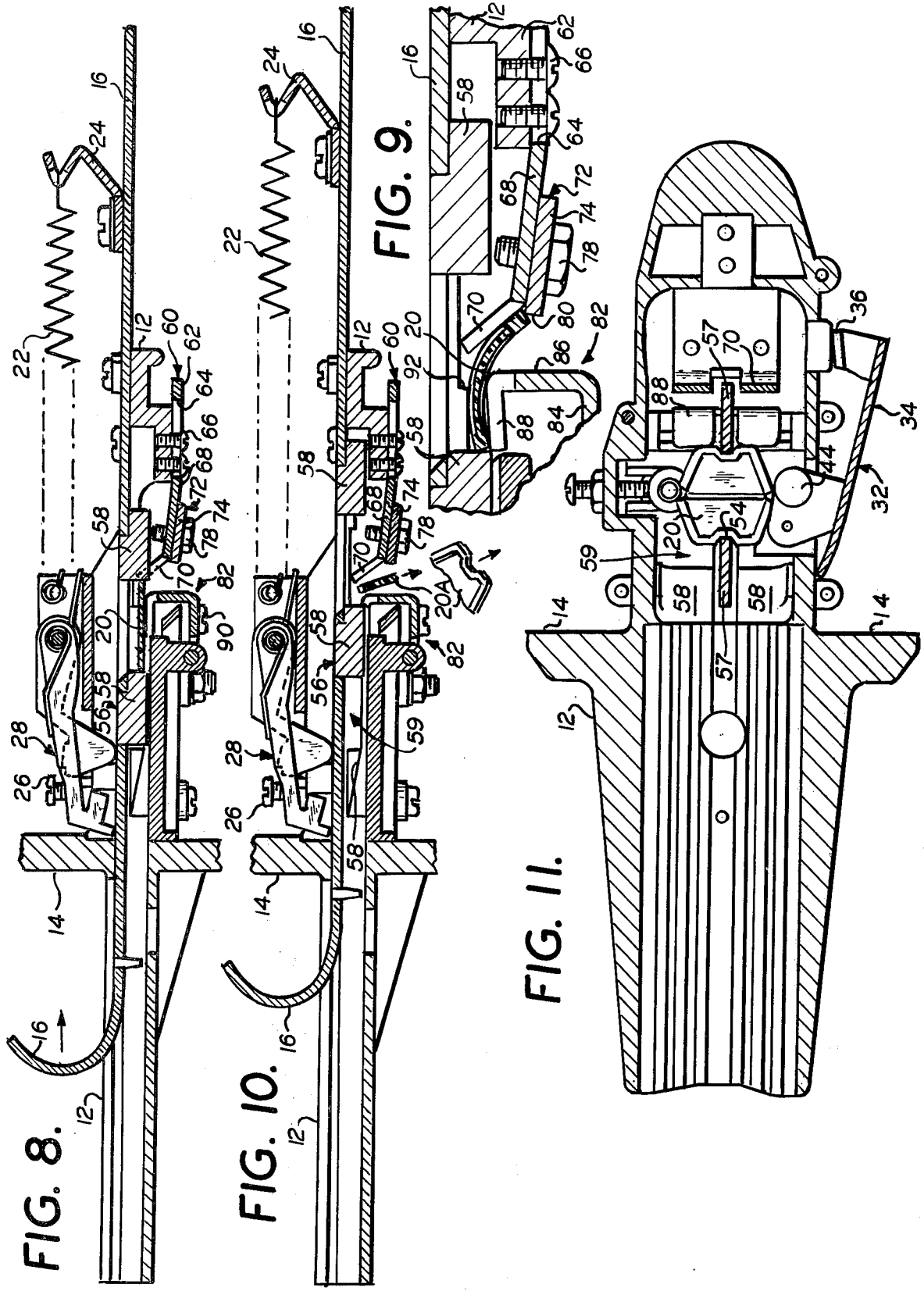

COIN OPERATING MECHANISM UTILIZING A NON-REUSABLE FRANGIBLE COIN-SIMULATING ELEMENT

BACKGROUND OF THE INVENTION

1. Field of the Invention

This invention relates generally to a coin slide assembly and, more particularly, to a novel combination of a coin controlled slide and a frangible coin simulating element. The presence of the element in the assembly is operative to allow movement of the coin slide toward an operative position. The element is fractured during movement of the coin slide to render the element non-reusable. The assembly is also responsive to the presence of a non-fracturable element during movement of the coin slide to jam the assembly and prevent the continued movement of said coin slide toward its operative position.

2. Description of the Prior Art

Coin controlled or operated mechanisms are usually installed on commercial appliances; such as, clothes washers, dryers, vending machines and the like. The coin control mechanism is enclosed within a housing mounted on the appliance or machine, and the housing is usually provided with a locked coin drawer assembly which is intended to prevent unauthorized access to a coin receptacle or box removably supported within the housing. The mechanism comprises a guide track mounted on the housing, and a coin slide reciprocally supported in the guide track for projected and retracted movement. The coin slide has one or more coin receiving portions whereby insertion of the proper sum of coins therein permits projected movement of the coin slide within the housing to operate the appliance. In this regard, the inner end of the coin slide includes an actuator adapted to engage with a switch mechanism upon projected movement of the coin slide to its operate position, whereby movement of said switch is operable to connect the appliance in circuit with a source of energy for initiating the operating cycle of the appliance.

The coin operated mechanisms described above are disposed for public use and are for the most part left unattended. Therefore, by the very nature of their use, such coin operated mechanisms are vulnerable to acts of vandalism and burglary. Heretofore, experience has shown that unauthorized access to the coin box of such coin operated mechanisms was had by forcing or destroying the lock on the coin box drawer, either by drilling or hammering. Because the lock on such mechanisms is generally exposed, a would-be thief has easy access thereto and therefore can readily apply the tools of his trade to force the lock. With the lock thus incapacitated, the thief then has easy access to the coin box of such mechanism. Consequently, thousands of dollars each year are lost as the result of acts of vandalism and burglary.

Even if the attempted theft fails, the face of the exposed lock is generally damaged beyond repair so that the lock is rendered totally inoperative. In such event, the lock must be removed and replaced, thereby increasing substantially the cost of maintenance and/or repair of the mechanism.

Heretofore, it has been known that such unauthorized and unlawful acts of vandalism can be substantially eliminated if the contents within the coin box were rendered valueless. For example, in U.S. Pat. No. 3,209,882, there is disclosed a destructible token for use in a parking meter system, wherein the token is fractured to render it non-reusable and the fractured pieces are then dissolved in a chemical solution. There is further disclosed in applicant's abandoned U.S. application, Ser. No. 860,956, filed Sept. 25, 1969, a combination coin operated mechanism and a non-reusable frangible coin-simulating element that is operative to activate the mechanism. The mechanism in that application is of the type having a coin slide which is adapted to receive the frangible element, and wherein the presence of said element in the mechanism is operative to allow projected movement of the coin slide to an operative position. The element is fractured during movement of the coin slide to render the element non-reusable.

Although the respective mechanisms disclosed in the aforesaid patent and abandoned application perform their intended functions, they nonetheless still afford the would-be thief an opportunity to circumvent the intended operation of said mechanisms. For example, in the mechanism of U.S. Pat. No. 3,209,882, the meter can be rendered operable even if a non-fracturable spurious token is inserted into the mechanism. Similarly, in the coin slide mechanism of the abandoned application Ser. No. 860,956, the coin slide can be moved to its operative position even where a spurious non-fracturable token is inserted into the mechanism provided the token is capable of being sufficiently flexed by the camming member so as to pass through an opening in the assembly to the coin box. Thus, the respective mechanisms disclosed above can be made to operate even if the respective tokens were non-fracturable. In some instances, the would-be thief has also been able to activate the mechanism by taping together a previously fractured element and reusing the same. The present invention is directed toward an improvement over the mechanism previously disclosed in the aforesaid abandoned application, wherein the improvement serves to prevent the coin slide from being moved to its operative position in those instances where the spurious token is non-fracturable.

SUMMARY OF THE INVENTION

The coin slide assembly of the present invention includes a coin slide reciprocally mounted in a guide track for projected movement to an operative position. The coin slide is adapted to receive a thin frangible element and includes transporting means for advancing the element conjointly with projected movement of the slide. The use of the frangible element replaces the need for using a conventional coin in the assembly in that the presence of the element is operative to allow projected movement of the coin slide toward its operative position.

Camming means is provided on the coin slide assembly adapted to engage with the frangible element upon projected movement of the coin slide. The camming means is adjustably positioned in the path of movement of the frangible element to deflect the element while permitting the coin slide to move toward its operative position. Constraining means is also provided to engage with the deflected frangible element upon projected movement of the coin slide. The constraining means is mounted on the camming means and is adjustably positioned in the path of movement of the deflected element to limit further movement of said element, whereby said element fractures upon the continued projected movement of the coin slide. The camming means and the constraining means are also responsive to the presence of a non-fracturable element in the coin slide assembly during projected movement of the coin slide to cause said non-fracturable element to jam the coin slide assembly and prevent the continued projected movement of the coin slide toward its operative position.

It is thus an object of the present invention to provide a coin slide assembly that is rendered operative by a non-reusable frangible coin-simulating element, and which element is thereafter automatically destroyed. The assembly is further responsive to the presence of a non-fracturable element to jam said assembly and prevent movement of the coin slide toward its operative position.

The above brief description of the invention and other objects, features and advantages of the said invention will become more apparent from a consideration of the following detailed description when taken in conjunction with the accompanying drawings.

BRIEF DESCRIPTION OF THE DRAWINGS

FIG. 4 is a sectional view taken through line 4—4 of FIG. 1, with the frangible coin simulating element received in the coin slide assembly;

FIGS. 5 through 10 are sectional views, similar to that of FIG. 4, showing successively advanced positions of the coin simulating element leading up to the fracture of said element; and wherein FIG. 9 is an enlarged view of the camming means and constraining means of the invention in engagement with the frangible element immediately prior to the fracture of said element; and FIG. 11 is a sectional view taken through line 11—11 of FIG. 7.

DESCRIPTION OF THE PREFERRED EMBODIMENT

Figure 1:
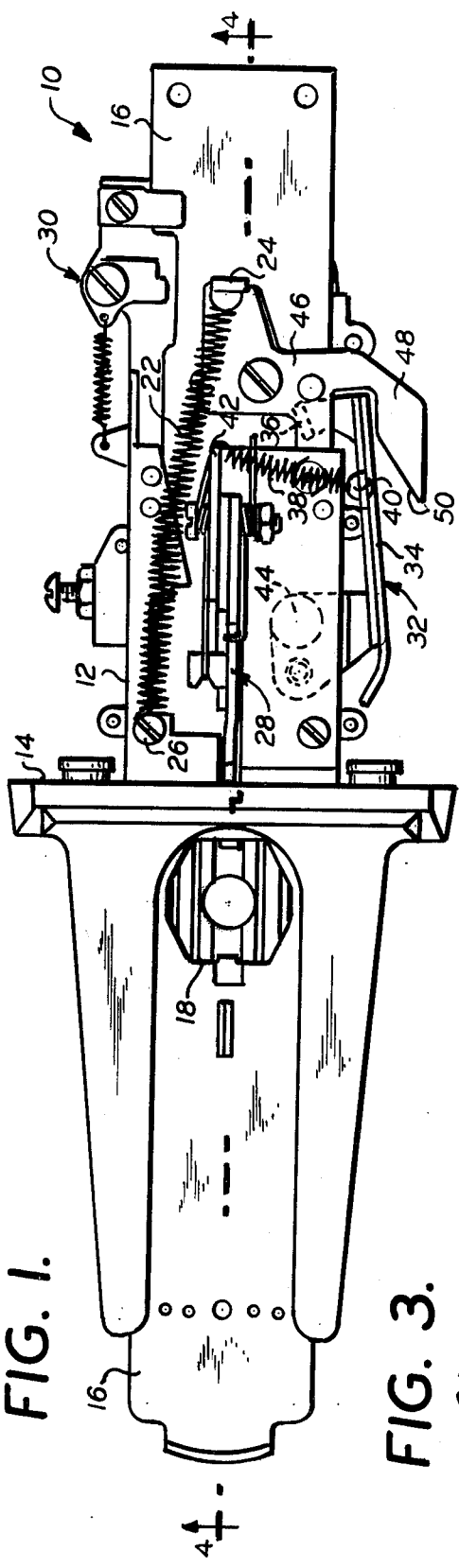
FIG. 1 is a top plan view of the coin slide assembly constructed in accordance with the present invention with the coin slide being illustrated in its retracted position.

Referring to the drawings, and more particularly to FIGS. 1 through 4, numeral 10 represents a coin slide assembly which is adapted to be enclosed in a housing (not shown) and installed on a commercial appliance such as a clothes washer, dryer, vending machine or the like. Assembly 10 includes a guide track 12 having an integrally formed faceplate 14 which is adapted to be secured to a wall of the housing for supporting the assembly in conventional manner. Guide track 12 reciprocally supports a coin slide 16 for projected and retracted movement thereof. Coin slide 16 is formed having a coin receiving portion 18 wherein the presence of a frangible coin simulating element 20 in said coin receiving portion 18 permits projected movement of the coin slide to its operate position within the housing. Such movement of the coin slide causes the inner end thereof to engage with a switch mechanism (not shown) which serves to connect the appliance in circuit with a power source for initiating the operating cycle of the appliance. Upon projected movement of coin slide 16, the frangible element 20 is carried by the slide and fractured, in a manner hereinafter described, whereupon the fractured pieces are discharged through an opening in the undersurface of guide track 12 and directed to a coin receptacle or box located therebelow. Access to the coin receptacle is permitted by a locked drawer suitably located in the housing, whereby said drawer may be conveniently unlocked and removed from the housing to permit the coin receptacle to be emptied at periodic intervals.

Coin slide assembly 10 is provided with the customary devices for effecting controlled movement of coin slide 16 and preventing unauthorized operation by slugs, washers and the like. For example, a spring 22 is provided having opposite ends connected to a post 24 on coin slide 16 and a post 26 on guide track 12. The spring serves to retract coin slide 16 back to its original starting or coin receiving position after the slide has completed projected movement to its operate position. Furthermore, protective means, indicated generally by the numeral 28, may be provided to insure that the coin simulating element 20 will be transmitted in a direction toward the coin receptacle when the coin slide 16 is projected to its operative position, thereby preventing retrieval of said element when the coin slide is retracted to its original position. In addition, a pawl and rack arrangement, indicated generally by numeral 30, may be provided to insure that the coin slide 16 can only be moved in a projected direction once the element 20 has been advanced a predetermined distance. However, after coin slide 16 has been fully projected to its operative position, the interengagement of the pawl and rack is such to permit only retracted movement of the coin slide to its original position. The above noted features have been shown in the drawings merely for illustrative purposes; the operation thereof being well known, and it is understood that said features form no part of the present invention.

Figure 2:
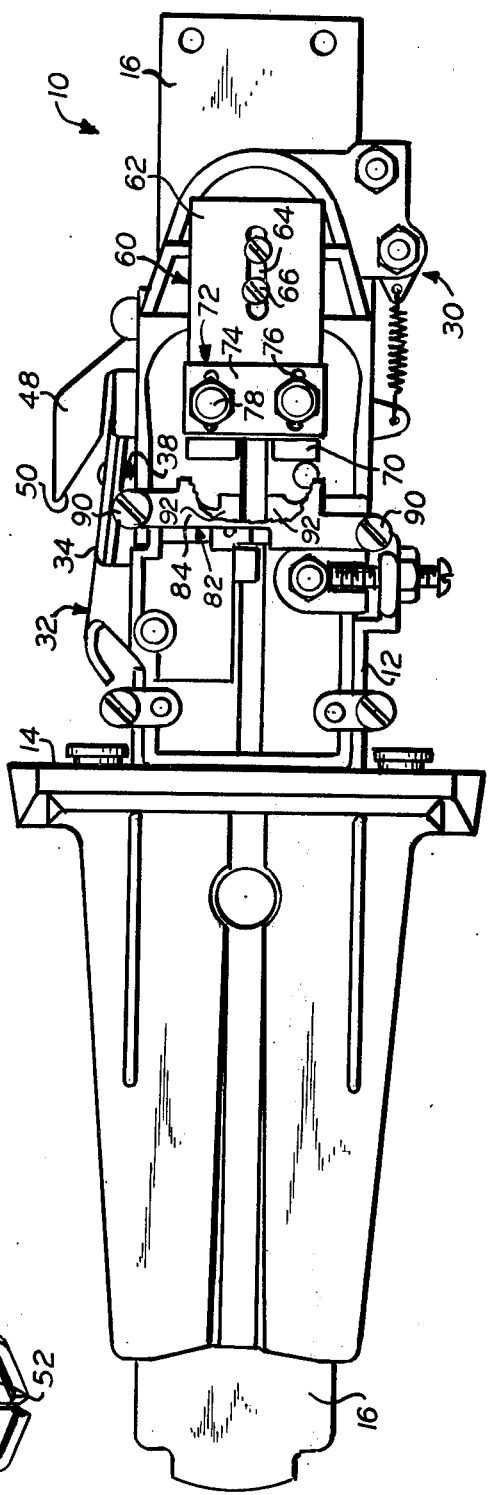
FIG. 2 is a bottom plan view of the coin slide assembly illustrated in FIG. 1.

Locking means, indicated generally by numeral 32, is provided to limit projected movement of coin slide 16 when the coin receiving portion 18 thereof is empty. Referring to FIGS. 1, 2 and 11, locking means 32 comprises a locking lever 34 that is pivotably mounted on guide track 12 for movement between first and second positions thereof. A finger 36 extends from locking lever 34 and is biased by a spring toward a longitudinal edge of coin slide 16 to define the first position of said locking lever when said coin slide is in its retracted coin receiving position. As shown in the drawings, spring 38 is connected between a post 40 on locking lever 34 and a post or bracket 42 on guide track 12.

Accordingly, when coin slide 16 is moved in a projected direction, finger 36 slides along said longitudinal edge to cooperate and interengage with a shoulder portion which serves as a stop to limit projected movement of the coin slide. The arrangement is such, however, that the presence of the coin-simulating element 20 in the coin receiving portion 18 of coin slide 16 is operative to displace locking lever 34 to its second position, thereby disengaging finger 36 from the shoulder stop portion to allow further projected movement of coin slide 16 to its operative position. In this connection, as best seen in FIG. 11, an outer edge portion of a portion of a properly sized coin-simulating element will bear against an upstanding pin 44 of locking lever 34 to pivot said locking lever outwardly to its second position and in disengaging relation to said shoulder stop portion. It will be appreciated that locking lever 34 will be biased back toward its first position by spring 38 when coin slide 16 is retracted to its initial coin receiving position.

There is further provided a bracket member 46 mounted on coin slide 16 for reciprocation therewith to insure that locking lever 34 will be urged to its first position when coin slide 16 is retracted to its coin receiving position. More particularly, bracket member 46 includes a dog-like portion 48 located to project laterally of coin slide 16 and in substantial alignment with locking lever 34; said dog-like portion 48 having a camming edge 50.

The arrangement is such that camming edge 50 is located to engage with an edge portion of locking lever 34, upon retracted movement of coin slide 16, and urge locking lever 34 to its first position to limit projected movement of the coin slide when the coin receiving portion thereof is empty. A more detailed description of the inter-cooperative relation between locking means 32 and bracket member 46 is set forth in U.S. Pat. No. 3,489,259 entitled Coin Slide With Positive Return Locking Lever. If desired, the post 24 adapted to receive one end of spring 22 may be formed integral with bracket 46.

Figure 3:
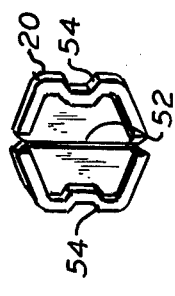
FIG. 3 is a perspective view of the frangible coin simulating element which allows movement of the coin slide toward its operative position.

The coin simulating element 20 is illustrated in FIG. 3 as being preferably fairly thin and formed of a plastic material or composition. Element 20 is formed having a score line 52 preferably located midway between opposite sides of the element to facilitate the fracture thereof in a manner hereinafter described. Alternatively, medial score line 52 may be replaced with a plurality of spaced openings constituting a perforated line. It will be appreciated that the dimensional configuration of frangible element 20 is complementary to that of the coin receiving portion 18 of coin slide 16. When element 20 is placed in coin receiving portion 18, the score line extends transversely to the longitudinal extent of coin slide 16. The forward and rearward edge portions of element 20 are each formed having a recess 54 which cooperates with accommodating structure on coin slide 16 to permit proper insertion of element 20 in coin receiving portion 18.

Referring to FIGS. 4–10, transporting means, represented generally by numeral 56, is provided on coin slide 16 for advancing element 20 therewith along the path of projected linear movement of said slide. The transporting means 56 include spaced abutment members 57 depending from the bottom of coin slide 16 at opposite edge portions of the coin receiving portion 18. In operation, a frangible element 20 is inserted in coin receiving portion 18 and caused to lie flat on guide track 12. Then, upon projected movement of coin slide 16 in the direction of the arrow, the rear abutment member 57 is received within the rear recess 54 of element 20 which serves to advance said element conjointly with projected movement of the slide. Movement of frangible element 20 takes place at a given first level, as seen in FIGS. 4 and 5, until the element is advanced by the abutment member to the right side of faceplate 14. Element 20 then travels down an incline surface 58, as seen in FIG. 6, under influence of gravity and a spring loaded finger of the protective means 28, until it lies flat at a second lower level of the assembly as seen in FIG. 7. Guide track 12 may thus be considered as being constructed having an opening, represented generally by numeral 59, for permitting frangible element 20 to pass therethrough from the first level to the second level of the assembly. Continued projected movement of coin slide 16 causes an outer edge portion of frangible element 20 to bear against pin 44, as seen in FIG. 11. Such movement serves to pivot locking lever 34 outwardly to its second position in disengaging relation to the shoulder stop portion of coin slide 16, in the manner hereinbefore described, to thereby allow further projected movement of the coin slide 16 to its operative position.

In accordance with the present invention, novel camming means, indicated generally by the numeral 60, is provided on the coin slide assembly 10 for deflecting the frangible element 20 during the movement thereof. Referring to the drawings, and more particularly to FIGS. 2 and 8–10, camming means 60 comprises a plate 62 having an elongated opening 64 extending longitudinally of the plate and between the slide edges thereof. Plate 62 is adjustably mounted on guide track 12 by means of threaded fasteners 66 passing through the plate opening 64. The end of plate 64 nearest to faceplate 14 is bent slightly upwardly, as represented by numeral 68, and terminates in a pair of laterally spaced legs 70 projecting upwardly into the path of movement of the frangible element 20. Legs 70 represent a camming portion which is located at the so-called second level of the assembly along which level element 20 is advanced upon continued projected movement of the coin slide. In this regard, plate 62 may be adjustably positioned lengthwise on guide track 12 within limits defined by the length of elongated opening 64. Such adjustment serves to locate camming legs 70 in the path of movement of frangible element 20 for deflecting said element, as shown in FIG. 9, upon projected movement of coin slide 16. The space between legs 70 is such to permit passage of abutment members 57 therethrough when coin slide 16 is fully projected to its operative position.

The invention further provides for novel constraining means, indicated generally by numeral 72, to limit further movement of frangible element 20 and assist in fracturing said element upon continued projected movement of the coin slide. Referring again to FIGS. 2 and 8–10, constraining means 72 comprises a plate 74 having a pair of laterally spaced enlarged openings 76. Plate 74 is adjustably mounted on the bent end portion 68 of camming plate 62 by means of threaded fasteners 78. The end of plate 74 nearest to faceplate 14 projects beyond the corresponding end of plate 62 to define a lip edge 80 for the camming legs 70. Plate 74 is adjustably positioned on camming plate 62, by reason of enlarged openings 76, to locate lip 80 in the path of movement of deflected element 20 and constrain further movement of said element.

Assembly 10 further includes an angled U-shaped bracket, represented generally by numeral 82, constructed having a first portion 84, a second portion 86 extending upwardly from portion 84, and a third portion 88 lying in a plane substantially parallel to the plane of first portion 84. Third portion 88 is bifurcated to define a pair of laterally spaced legs. Bracket 82 is mounted on guide track 12 by means of threaded fasteners 90 passing through accommodating openings in bracket portion 84. The mounting arrangement is such that bracket portion 88 represents a continuing surface of guide track 12 over which frangible element 20 passes upon projected movement of coin slide 16. The said continuing surface is inclined slightly upwardly in the direction toward camming legs 70 to direct frangible element 20 against said camming legs upon movement of the coin slide.

In operation, it will be appreciated that the primary function of frangible element 20 is satisfied after it has displaced locking lever 34 to the second position thereof. The further projected movement of coin slide 16 now serves to transport frangible element 20 over bracket portion 88 toward the camming means 60. In this regard, camming legs 70 engage with frangible element 20 and serve to progressively deflect and flex said element downwardly upon continued movement of the slide. Movement of element 20 continues until the forward edge thereof engages with the constraining lip 80 to limit further movement of said element. It will be appreciated that frangible element 20 is thereby wedged between rear abutment member 57 and constraining lip 80 whereby the continued projected movement of coin slide 16 to its fully operative position causes deflected element 20 to fracture, as seen in FIGS. 9 and 10. It is to be noted in FIG. 9 that the surface portions of guide track projections 92, which are located above bracket leg portions 88, also serve to limit upward movement of element 20 during the fracture of said element. Furthermore, the space between constraining means 72 and bracket 82 is great enough to permit the fractured pieces 20A of the element to fall therethrough into a box or receptacle conveniently located within the coin slide assembly.

In those instances where a would-be thief attempts to operate the assembly with a flexible but non-fracturable element, the camming means 60 and constraining means 72 are responsive to the presence of said non-fracturable element to jam the assembly. In this regard, assume that the frangible element 20 of FIG. 9 is replaced with a non-fracturable element. Alternatively, assume that the pieces of a previously fractured element are taped together so as not to become separated upon reuse. In either case, the deflected spurious element becomes wedged in the space between rear abutment member 57 and constraining lip 80 upon projected movement of coin slide 16 in the manner previously indicated. However, if the spurious element does not fracture, the presence of said element in said space will prevent the continued projected movement of coin slide 16 thereby causing coin slide assembly 10 to jam. It will be appreciated that the space between constraining means 72 and bracket 82 is small enough to prevent a non-fracturable element from falling therethrough.

From the foregoing description, it will be readily apparent that acts of vandalism currently taking place in connection with coin operated machines can be substantially eliminated by means of the present invention in view of the fact that the contents within the coin boxes of the respective machines are of no value. The frangible coin-simulating element is automatically destroyed upon operation of the coin slide assembly. In those instances where a spurious non-fracturable element is inserted in the mechanism, the assembly will jam to prevent movement of the coin slide toward its operative position.

While a preferred embodiment of the invention has been shown and described in detail, it will be readily understood and appreciated that various changes or modifications thereof may be made without departing from the spirit and scope of the invention as set forth in the appended claims.

I claim:

1. In combination with a coin slide assembly having a coin slide reciprocally mounted in a guide track for projected movement to an operative position; wherein the improvement comprises:
   (a) transporting means on the coin slide adapted for advancing a thin frangible element therewith along the path of projected movement of said coin slide, wherein the presence of said frangible element is operative to allow continued movement of said coin slide toward its operative position;
   (b) camming means on the coin slide assembly adapted to engage with the frangible element upon projected movement of the coin slide, said camming means comprising a plate having a portion adjustably positioned in the path of movement of said frangible element for deflecting said frangible element while permitting said coin slide to move toward its operative position; and
   (c) constraining means on said camming means adapted to engage with the deflected frangible element upon projected movement of the coin slide, said constraining means comprising a second plate mounted on said camming plate and having an edge portion adjustably positioned in the path of movement of said deflected frangible element to locate said edge portion as a lip for the camming portion, said lip being positioned to engage with the deflected frangible element and constrain further movement thereof for fracturing said deflected frangible element upon continued projected movement of said coin slide; and
   (d) wherein said camming means and said constraining means are responsive to the presence of a non-fracturable element in the coin slide assembly during projected movement of the coin slide to cause said non-fracturable element to jam said coin slide assembly and prevent the continued projected movement of said coin slide toward its operative position.

2. The coin slide assembly as recited in claim 1, wherein said camming portion comprises a pair of laterally spaced legs extending outwardly from an edge portion of said camming plate and projecting into the path of movement of the frangible element.

3. The coin slide assembly as recited in claim 1, wherein said transporting means comprises an abutment member depending from the coin slide, said abutment member being located to engage an edge of the frangible element upon projected movement of said coin slide for advancing said frangible element conjointly therewith, said frangible element being deflected by the camming portion upon projected movement of said coin slide and thereafter becoming wedged between said abutment member and said constraining lip, said deflected frangible element fracturing upon continued movement of said coin slide toward its operative position, and wherein the presence of a non-fracturable element in the space between said abutment member and said constraining lip will jam said coin slide assembly to prevent the continued projected movement of said coin slide.

4. The coin slide assembly as recited in claim 3, wherein said frangible element has a forward edge portion and said coin slide assembly has a stationery edge portion, the forward edge portion of said frangible element passing over said stationery edge portion upon projected movement of the coin slide and being deflected by said camming means, said constraining means being spaced from said stationary edge portion by a distance great enough to permit the fractured pieces of the frangible element to fall through said space and small enough to prevent a non-fracturable element from falling therethrough.

5. In combination with a coin slide assembly having a coin slide reciprocally mounted in a guide track for projected movement to an operative position; wherein the improvement comprises:
- (a) transporting means on the coin slide adapted for advancing a thin frangible element therewith along the path of projected linear movement of said coin slide at a given level, wherein the presence of said frangible element is operative to allow continued movement of said coin slide toward its operative position;
- (b) said transporting means comprising an abutment member depending from the coin slide and located to engage an edge of the frangible element upon projected movement of said coin slide for advancing said frangible element conjointly therewith;
- (c) said coin slide assembly having an opening in the guide track for permitting the frangible element to pass therethrough to a second level upon continued projected movement of the coin slide;
- (d) camming means on the coin slide assembly adapted to engage with the frangible element upon projected movement of the coin slide, said camming means having a camming portion located at the second level and being adjustably positioned in the path of movement of said frangible element for deflecting said frangible element while permitting said coin slide to move toward its operative position; and
- (e) constraining means on said camming means adapted to engage with the deflected frangible element upon projected movement of the coin slide, said constraining means comprising a plate having an edge portion, said plate being adjustably positioned in the path of movement of said deflected frangible element to locate said edge portion as a lip for the camming portion, said lip being positioned to engage with the deflected frangible element and constrain further movement thereof whereby said deflected frangible element is wedged between said abutment member and said constraining lip for fracturing said deflected frangible element upon continued projected movement of said coin slide; and
- (f) wherein said camming means and said constraining means are responsive to the presence of a non-fracturable element in the space between said abutment member and said constraining lip during projected movement of the coin slide to cause said non-fracturable element to jam said coin slide assembly and prevent the continued projected movement of said coin slide toward its operative position.

6. The coin slide assembly as recited in claim 5, wherein said frangible element has a forward edge portion and said coin slide assembly has a stationery edge portion, the forward edge portion of said frangible element passing over said stationery edge portion upon projected movement of the coin slide and being deflected by said camming means, said constraining means being spaced from said stationery edge portion by a distance great enough to permit the fractured pieces of the frangible element to fall through said space and small enough to prevent a non-fracturable element from passing therethrough.

* * * * *